Patented July 1, 1924.

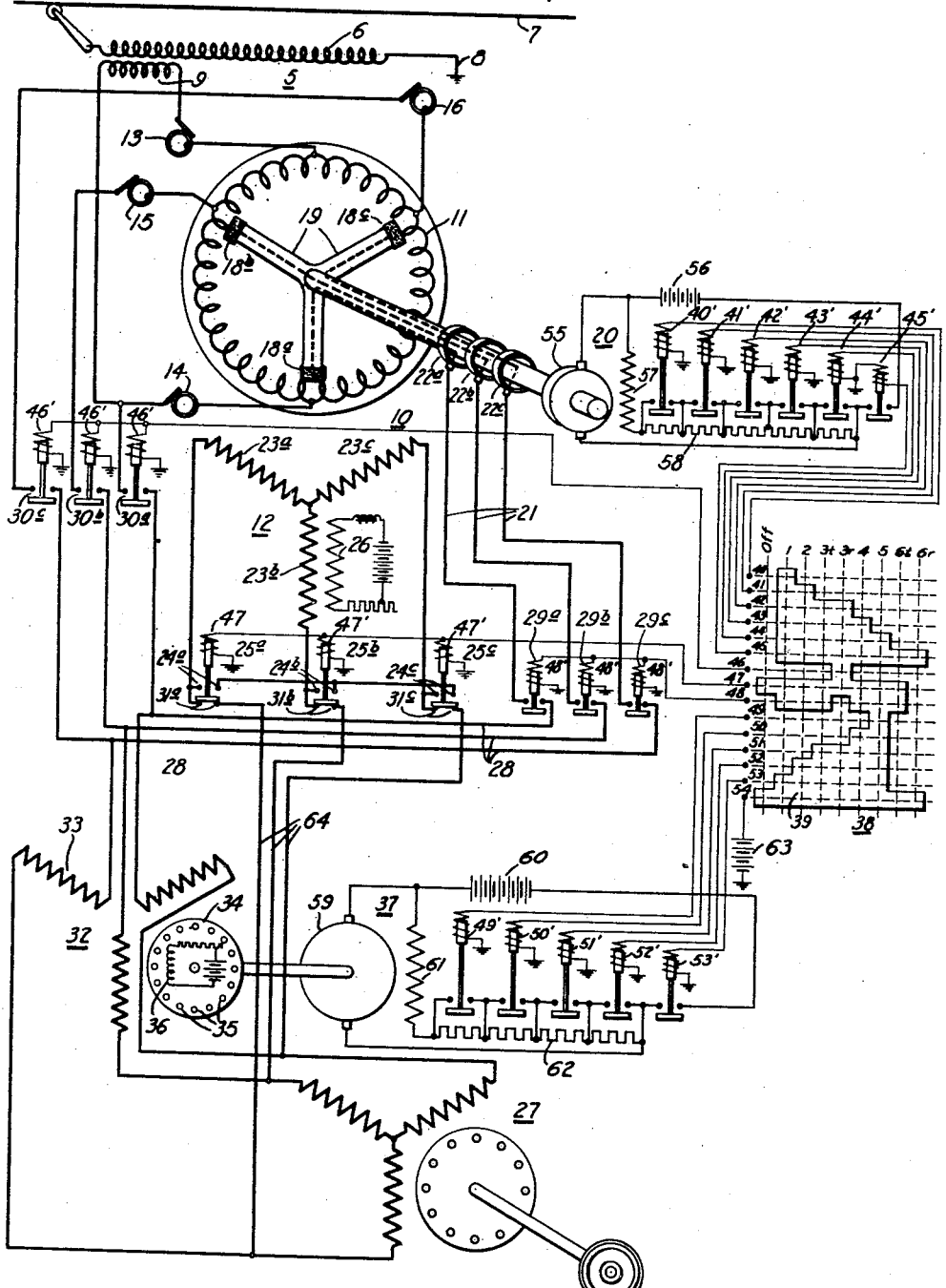

1,499,360

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

FREQUENCY-CONVERTER METHOD AND SYSTEM.

Application filed April 27, 1922. Serial No. 556,859.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Frequency-Converter Methods and Systems, of which the following is a specification.

My invention relates to a combined phase converter and frequency changer which is particularly adapted for accelerating induction motors.

One of the objects of my invention is to provide a system for converting from single-phase currents, or unbalanced polyphase currents, to balanced polyphase currents, with provision for varying the frequency of said balanced polyphase currents.

Another object of my invention is to provide a frequency changer in which the employment of resistance elements is avoided.

Still another object of my invention is to provide a combined phase converter and frequency changer which is capable of operating, at all times, at unity power-factor or at any other desired power-factor.

Another object of my invention is to associate, with a phase and frequency converter, a series-connected harmonic eradicator machine having means for driving the same, and means for simultaneously varying the speed of said driving means and the derived frequency of said converter.

A further object of my invention is to provide a system in which commutator currents of variable frequency are generated for driving an induction motor during accelerating periods, while permanent running speeds are obtained by means of slip-ring currents of constant frequency.

A still further object is to provide improvements relating to a system including a combined frequency converter and frequency changer having primary and secondary windings, line-frequency currents being obtained, at times, from said primary windings with the secondary windings short-circuited, and double-frequency currents being obtained, at other times, from said secondary windings with the short-circuiting connections omitted, while intermediate frequencies are obtained through a commutator device having a rotatable brush system.

With these and other objects in view, my invention consists in the methods and apparatus described in the following specification and illustrated in the accompanying drawing, wherein:

The single figure is a diagrammatic view of apparatus and connections embodying one form of my invention.

Single-phase power, or unbalanced polyphase power, may be supplied by any means whatsoever. I have shown a single-phase transformer 5, the primary winding 6 of which derives energy from a trolley wire 7 and ground connection 8. The secondary winding 9 of the transformer supplies power to my converter system.

The combined phase converter and frequency changer is a dynamo-electric machine 10, similar to a rotary converter, said machine having a polyphase commutated primary member 11 and a secondary member 12. The primary winding may be connected, at diametrically opposite points, to slip rings 13 and 14, and, at three symmetrical points, to slip rings 14, 15 and 16. The polyphase primary winding 11 constitutes, in effect, a single-phase primary winding and a tertiary winding of a phase converter.

The commutator for the commutated primary member 11 may take any desired form but, as shown, comprises brushes 18a, 18b and 18c, which are carried by a rotating system, such as a spider 19 so as to have a relative phase displacement of 120 electrical degrees. The rotating spider 19 may be driven at any desired speed, as by an adjustable-speed motor 20, and the brushes 18a, 18b and 18c are connected to a polyphase supply line 21 through slip-rings 22a, 22b and 22c.

The single-phase power which is supplied to the converter may be considered as an extreme case of unbalanced polyphase power and may be resolved into two oppositely-rotating balanced polyphase systems. In phase or frequency changing, as it is desired to utilize only the forwardly rotating system, it is necessary to provide the machine with a secondary member having good damper windings for damping out the double-frequency currents induced therein by the backwardly rotating system.

In the illustrated embodiment of my invention, I have indicated the secondary member 12 as having a three-phase winding 23a, 23b and 23c which may be short-circuited through upper contacts 24a, 24b and 24c on relays 25a, 25b and 25c. Any desired form of unidirectional exciting means, such as a separate winding 26, may also be provided for causing the converter to operate at synchronous speed with the possibility of power-factor correction.

The above-described converter system is illustrated as being applied to locomotive service wherein induction motors, which may be of the squirrel-cage type, as indicated at 27, are employed for propulsion purposes. The induction-motors are connected to mains 28 which may be connected, as by relay switches 29a, 29b and 29c, to the commutator-current supply line 21. Two permanent running speeds of the motors may be obtained by connecting the motor terminals either to the primary slip-rings 14, 15 and 16, through relay switches 30a, 30b and 30c, or to the secondary windings 23a, 23b and 23c, through lower contacts 31a, 31b and 31c, on the previously mentioned relays 25a, 25b and 25c.

The propulsion motors 27 may thus be energized either at line frequency or at double frequency without drawing current from the commutator, and the brushes 18a, 18b and 18c may, at such times, be moved out of engagement with the commutator segments, by any means (not shown) provided for that purpose. The relay switches 29a, 29b and 29c are energized only for transient or accelerating speeds, and the frequency may be varied between zero and double frequency, or even higher, by varying the speed of the driving motor 20 for the brushes 18a, 18b and 18c.

When the brush system is stationary, the machine 10 operates as a rotary converter, and direct-current electromotive forces appear at the brushes 18a, 18b and 18c. When the brushes are revolved in the direction of the rotor member 11 of the main machine, polyphase alternating currents appear at the commutator brushes, said polyphase currents having a frequency proportional to the speed of the brushes. At synchronous speed, the brushes deliver polyphase currents of line frequency, and, at over-synchronous speed, the brushes deliver currents of a correspondingly higher frequency.

However, when polyphase power is supplied from a machine of the character described, small negative-phase-sequence currents of different frequency flow in the primary windings of the machine, by reason of the ohmic resistance of the rotor windings and the imperfect magnetic coupling between the rotor and the stator. Consequently, in spite of the good damper windings, small negative-phase-sequence electromotive forces appear at the rotating brushes having a frequency proportional to the algebraic sum of the line frequency plus the relative speed of the brushes with respect to the commutator.

Any undesired negative-phase-sequence current tending to flow in the leads connected to the rotating brush system may be eliminated by means of a hormonic eradicator machine 32, such as is described in my copending application Serial No. 258,578, filed Oct. 17, 1918. The harmonic eradicator is an induction machine comprising a polyphase primary winding 33 connected in series with the motor 27 and having a secondary member 34 which has a damper winding 35 and rotates at substantially synchronous speed corresponding to the frequency of the current to be eradicated. Since the objectionable currents have a negative phase-sequence with respect to the phase-sequence of the desired currents supplied to the motor 27, the secondary member 34 of the eradicator rotates backwardly with respect to the motor 27 at such speeds as to generate a synchronous impedance, preventing the flow of the negative-phase-sequence currents. If desired, the secondary member 34 may be provided with a unidirectional exciting winding 36 whereby the eradicator may be caused to rotate in exact synchronism with the negative-phase-sequence currents and the eradication may be rendered more perfect. The capacity of the series eradicator 32 may be very small as compared with that of the main machine since the negative-phase-sequence electromotive forces are small.

The series eradicator 32 tends to run by itself at the proper speed, provided it is once started in the backward direction. The eradicator may, therefore, be left to run by itself, or it may be driven by means of mechanical gearing or by means of a driving motor having approximately the correct speed adjustment.

In the embodiment of my invention illustrated in the drawing, I have shown a driving motor 37 for the series eradicator, the speed of said motor being controlled simultaneously with that of the driving motor 20 for the brush system.

It is understood that the frequency of the undesirable currents, which determines the speed of the series balancer, varies from twice the line frequency, when the brushes are at standstill, to line frequency, when the brushes are revolving at synchronous speed, and the undesirable currents vanish altogether when the brushes are revolving at twice the synchronous speed. For higher brush speeds the phase sequence of the undesired currents reverses and their frequency becomes equal to the actual brush speed minus double frequency speed.

For illustrative purposes, I have shown a drum controller 38 for driving the propulsion motor 27 at various speeds from zero to double synchronous speed. The drum controller comprises a rotatable contactor portion 39 co-operating with a series of stationary contact members 40 to 54.

The contacts 40 to 45 are connected to similarly numbered relays 40' to 45' adapted to control the speed of the motor 20 driving the rotating brush system. Said motor has its armature member 55 energized from a suitable source 56 through the relay 45', and it has a field winding 57 energized from the same source through the relay 45' and a resistance element 58 which may be short-circuited in sections by means of the relays 40' to 44'.

The controller contacts 46, 47 and 48 are connected, respectively, to the coils 46' of the relays 30a, 30b and 30c, the coils 47' of the relays 25a, 25b and 25c, and the coils 48' of the relays 29a, 29b and 29c.

The contact elements 49 to 53 of the controller are connected to similarly numbered relays 49' to 53' for controlling the speed of the motor 37 driving the series eradicator 32. The motor 37 has its armature member 59 energized from a source 60 through the relay 53', and it has a field winding 61 energized from the same source through said relay 53' and a resistance element 62 which may be short-circuited in sections by means of the relays 49' to 52'.

The contact element 54 of the controller is connected to the positive terminal of a suitable source 63, the negative terminal of which is grounded, the negative terminals of the respective relay coils 40' to 53' being similarly grounded to complete the circuit.

In the "off" position of the controller, only the contact 47 is energized moving the switches 25a, 25b and 25c to their upper positions in which the secondary windings 12 are short-circuited.

In the first position of the controller the contacts 41 to 45 are all closed, thus starting the motor 20 at its slowest speed. At the same time the contact 53 is energized, thus starting the motor 37 at its highest speed, corresponding to nearly double synchronous speed, whereby the eradicator 32 may damp out the undesired currents of corresponding frequency. At the same time, the contact 48 is energized to connect the mains 28 to the slip-rings of the rotating brush system, while the secondary 12 of the main converter remains short-circuited.

In the second and third controller positions, sections of the resistance 58 are successively inserted in the field circuit of the motor 20, thus increasing the speed of the motor, while sections of the resistance 62 in the field circuit of the motor 37 are successively short-circuited to reduce the speed of the motor, the contacts 47 and 48 remaining energized as before. The resistances are so adjusted that the brush driving motor 20 is now running at substantially synchronous speed so that the third position of the controller is marked 3t and is designed for transient service only, the permanent running connection at this speed being provided by an additional controller position marked 3r, in which the contact 48, controlling switches 29a, 29b and 29c is deenergized, and the contact 46 is energized to connect the mains 28 to the primary slip-rings 14, 15 and 16 of the converter, causing the latter to run as an ordinary phase-converter.

For over-synchronous speeds of the motor 27, the controller is moved to positions 4, 5 and 6t wherein the contact 46 is deenergized to disconnect the mains 28 from the primary slip-rings, while the contact 48 is reconnected to energize the switches 29a, 29b and 29c. At the same time, the switches 42', 43' and 44' are successively deenergized to increase the speed of the motor 20 until finally the double synchronous speed is reached, and the corresponding speeds of the eradicator driving motor 37 are obtained by energizing switches 50' and 49' and finally opening the switch 53' to stop the motor 37 altogether.

The final or running position of the controller, corresponding to double-frequency operation of the motor 27, is obtained by deenergizing the contacts 47 and 48, whereby the mains 28 are disconnected from the rotating brush system, the short-circuit of the secondary windings 12 is broken and said windings are connected directly to the terminals of the motor 27 by means of conductors 64. It will be noted that the conductors 64 are connected directly to the motor terminals in such manner as to by-pass the eradicator 32 which is now useless, while the mains 28 are connected to the motor 27 through the primary windings of the eradicator 32.

While I have shown a controller for carrying the speed of the motor 27 only up to double synchronous speed, it is understood that higher speeds may be obtained by connecting the motor to the rotating brush system and further increasing the speed of the brush driving motor 20, while the eradicator driving motor 37 is reversed and accelerated in the reverse direction.

This application is a continuation, in part, of the subject-matter disclosed in my copending application Serial No. 442,761, filed Feb. 5, 1921, and showing a similar system for accelerating a locomotive motor from zero speed up to synchronous speed corresponding with the line frequency. The claims in said copending application are drawn to cover the phase and frequency converting machine 10, or the combination of this machine with two systems or translating devices having different phase numbers or frequencies, whereas the claims in the present application are drawn to cover the system for controlling the speed of the induction motor 27, and combinations including the series balancer 32.

Certain features of my invention as herein claimed are also shown in my copending application Serial No. 254,313, filed September 16, 1918, wherein the motor is accelerated from zero speed up to synchronous speed corresponding with line frequency, by employing a commutator and rotating brush system in connection with the secondary windings of a combined phase and frequency converter such as that shown herein.

I have shown the main converter as having a rotating primary member and a stationary secondary member. It is, of course, understood that this arrangement could be reversed, and I intend that the language of the following claims shall be construed to cover such reversed arrangement. With a stationary primary winding and a stationary commutator cylinder, it will be necessary, of course, to revolve the commutator brushes at synchronous speed for zero frequency, at zero speed for line frequency, and at synchronous speed in the opposite direction for double frequency.

It is also to be understood that the direct-current exciting means for the converter 10 is not essential when the machine is operating as a shunt phase converter, since good balancing may be obtained with the machine running at any speed near synchronism, provided that it has good damper windings. However, the direct-current excitation is very desirable for power-factor compensation, as well as for improving the balancing action.

The frequency-changing system herein described is particularly applicable for induction-motor control, such as is necessary in railway work, since the standstill torque of an induction motor, with any given primary current, is inversely proportional to the frequency. It is thus seen that I have provided, in a single constant-speed machine, a particularly advantageous means for accelerating the driving motors of locomotives, together with means for transferring the load to an ordinary phase-converter connection without frequency conversion, and other means for transferring the load to an ordinary frequency-doubler connection.

While I have described my invention with particular reference to the motor operation of the propulsion motor 27, it will be understood that, when the locomotive is running down grade, the motor will be returning power to the trolley line 7, so that the converter system is then utilized to transmit power in the direction opposite to that considered in the above explanation. It will also be obvious that the controller 38 may be employed to reduce the speed of the locomotive 27, by moving the controller slowly backward to its first position, during which time the speed of the locomotive will be correspondingly reduced, causing the propulsion motor to return energy back to the line 7.

While I have referred to a preferred embodiment of my invention, in order to illustrate the principles thereof, it is to be understood that numerous changes and modifications may be made by those skilled in the art without departing from the spirit and scope of the invention, as defined in the appended claims. I desire, therefore, that only such restrictions shall be placed upon my invention as are set forth in the claims, or are imposed by the prior art.

I claim as my invention:

1. In combination, a phase and frequency converter having an armature member, a field member, single-phase slip-rings for said armature member, a commutator cylinder for said armature member, a wound damper winding on said field member, a rotatable brush system cooperating with said commutator cylinder, said brush system including a plurality of substantially symmetrically spaced brushes for carrying polyphase currents, means for varying the speed of said brush system, a variable-frequency translating device, and means for, at times, connecting said translating device to said brushes, and, at other times, connecting said translating device to said damper winding.

2. In combination, a phase and frequency converter having an armature member, a field member, a plurality of slip-rings for said armature member, a single-phase system connected to said slip-rings, polyphase terminals connected to said slip-rings, a commutator cylinder for said armature member, a damper winding on said field member, a rotatable brush system co-operating with said commutator cylinder, said brush system including a plurality of substantially symmetrically spaced brushes for carrying polyphase currents, means for varying the speed of said brush system, a variable-frequency translating device, and means for, at times, connecting said translating device to said brushes, and, at other times, connecting said translating device to said polyphase terminals.

3. In combination, a phase and frequency converter having an armature member, a field member, a plurality of slip-rings for said armature member, a single-phase system connected to said slip-rings, polyphase terminals connected to said slip-rings, a commutator cylinder for said armature member, a wound damper winding on said field member, a rotatable brush system co-operating with said commutator cylinder, said brush system including a plurality of substantially symmetrically spaced brushes for carrying polyphase currents, means for varying the speed of said brush system, a variable-frequency translating device, and means for, at times, connecting said translating device to said brushes, at other times connecting said translating device to said polyphase terminals, and at still other times connecting said translating device to said damper winding.

4. In combination, a phase and frequency converter having an armature member, a field member, a plurality of slip-rings for said armature member, a single-phase system connected to said slip-rings, polyphase teminals connected to said slip-rings, a wound damper winding on said field member, a variable-frequency translating device, and means for, at times, connecting said translating device to said polyphase terminals, and, at other times, connecting said translating device to said damper winding.

5. In combination, a phase and frequency converter having an armature member, a field member, a plurality of slip-rings for said armature member, a single-phase system connected to said slip-rings, polyphase terminals connected to said slip-rings, a commutator cylinder for said armature member, a wound damper winding on said field member, a rotatable brush system co-operating with said commutator cylinder, said brush system including a plurality of substantially symmetrically spaced brushes for carrying polyphase currents, means for varying the speed of said brush system, an alternating-current motor, means for operating said motor from said polyphase terminals to secure a low running speed, means for operating said motor from said damper winding to secure a high running speed, and means for operating said motor from said brushes to secure transition speeds.

6. In combination, a phase and frequency converter having an armature member, a field member, a plurality of slip-rings for said armature member, a single-phase system connected to said slip-rings, polyphase terminals connected to said slip-rings, a commutator cylinder for said armature member, a damper winding on said field member, a rotatable brush system co-operating with said commutator cylinder, said brush system including a plurality of substantially symmetrically spaced brushes for carrying polyphase currents, means for varying the speed of said brush system, a variable-frequency translating device, means for, at times, connecting said translating device to said brushes and, at other times, connecting said translating device to said polyphase terminals, and a series eradicator machine connected, at all times, in series with said translating device.

7. The combination with two alternating-current systems, only one of which has substantially balanced polyphase power, of a constant-speed dynamo-electric machine having a polyaxially closed-circuit secondary winding and a primary winding, said primary winding being provided with both a commutator cylinder and slip rings and being connected between said alternating-current systems, whereby one of said systems derives energy from the other, means comprising revoluble commutator brushes for independently determining the frequency of said energy, and a series eradicator machine connected in series circuit relation to said balanced polyphase system and said first-mentioned machine.

8. The combination with a source of variable-frequency currents, of means for varying said frequency, at will, a translating device, a series eradicator machine connecting said translating device and said source, means for driving said series eradicator machine, and means for varying the speed of said driving means simultaneously with said frequency-varying means.

9. In combination, a phase and frequency converter having a polyphase primary winding, a wound damper winding, a single-phase line connected to said primary winding, polyphase terminals connected to said primary winding, a commutator cylinder for one of said windings, a rotatable brush system co-operating with said commutator cylinder, said brush system including a plurality of substantially symmetrically spaced brushes for carrying polyphase currents, means for varying the speed of said brush system, a variable-frequency translating device, and means for, at times, connecting said translating device to said brushes and, at other times, connecting said translating device to said damper winding.

10. In combination, a phase and frequency converter having a polyphase primary winding, a damper winding, a single-phase line connected to said primary winding, polyphase terminals connected to said primary winding, a commutator cylinder for one of said windings, a rotatable brush system co-operating with said commutator cylinder, said brush system including a plurality of substantially symmetrically spaced brushes for carrying polyphase currents, means for varying the speed of said brush system, a variable-frequency translating device, and means for, at times, connecting said translating device to said brushes and, at other times connecting said translating device to said polyphase terminals.

11. In combination, a phase and frequency converter having a polyphase primary winding, a wound damper winding, a single-phase line connected to said primary winding, polyphase terminals connected to said primary winding, a commutator cylinder for one of said windings, a rotatable brush system co-operating with said commutator cylinder, said brush system including a plurality of substantially symmetrically spaced brushes for carrying polyphase currents, means for varying the speed of said brush system, a variable-frequency translating device, and means for, at times, connecting said translating device to said brushes, at other times connecting said translating device to said polyphase terminals, and at still other times connecting said translating device to said damper windings.

12. In combination, a phase and frequency converter having a polyphase primary winding, a damper winding, a single-phase line connected to said primary winding, polyphase terminals connected to said primary winding, a commutator cylinder for one of said windings, a rotatable brush system co-operating with said commutator cylinder, said brush system including a plurality of substantially symmetrically spaced brushes for carrying polyphase currents, means for varying the speed of said brush system, a variable-frequency translating device, means for, at times, connecting said translating device to said brushes and at other times connecting said translating device to said polyphase terminals, and a series eradicator machine connected in series with said translating device.

13. The combination with a synchronous single-phase machine having a commutator-type primary winding, of a rotatable brush system co-operating with the commutator member, said brush system including a plurality of substantially symmetrically spaced brushes for deriving polyphase currents from said synchronous machine, means for varying the speed of said brush system, and means for impeding certain polyphase currents of one phase sequence while permitting the flow of certain polyphase currents of another phase sequence.

14. The combination with a synchronous single-phase machine having a commutator-type primary winding, of a rotatable brush system including a plurality of substantially symmetrically spaced brushes for deriving polyphase currents from said synchronous machine, means for varying the speed of said brush system, means for permitting the flow of certain polyphase currents of one phase sequence while opposing the flow of polyphase currents of all other phase sequences.

15. The combination with a synchronous single-phase machine having a commutator-type primary winding, of a rotatable brush system co-operating with said commutator, said brush system including a plurality of substantially symmetrically spaced brushes for deriving polyphase currents from said synchronous machine, means for varying the speed of said brush system, a dynamo-electric series eradicator for impeding the flow of polyphase currents of a given phase sequence, said series eradicator comprising a polyphase primary winding and a poly-axially short-circuited secondary winding, and means varying in accordance with the speed of rotation of said brush system for driving the rotor of said series balancer at substantially synchronous speed with respect to the currents which it is designed to impede.

16. The combination with a synchronous, single-phase, double-current machine having an armature winding connected to a commutator and slip-rings, of an induction machine adapted to rotate in synchronism with the currents generated by the backwardly rotating component field of said double-current machine, said induction machine being serially connected to said double-current machine.

17. The combination with a synchronous, single-phase, double-current machine having an armature winding connected to a commutator and slip rings, of an induction machine adapted to rotate at substantially double synchronous speed, said induction machine being serially connected to said double-current machine.

18. The combination with a synchronous, single-phase, double-current machine having an armature winding connected to a commutator and slip rings and having a unidirectionally excited field winding, of a brush system co-operating with said commutator, and an induction machine having a primary winding connected in series circuit relation to said brush system and having a polyaxially closed-circuited secondary winding adapted to rotate relatively to said primary winding in substantial synchronism with the substantially double-frequency currents tending to flow in said brush system.

19. The combination with two alternating-current lines of relatively variable frequencies, only one of said lines being a balanced polyphase line, of a frequency converter interconnecting said lines for the interchange of power, a polyphase series eradicator machine connected between said converter and said balanced polyphase line, means for driving said eradicator machine, and means for simultaneously varying the speed of said driving means and the relative frequencies of said lines.

20. A system including a frequency converter having primary windings, secondary windings, slip-rings for said primary windings, a commutator cylinder for said primary windings, a rotatable brush system co-operating with said commutator cylinder, means for varying the speed of said brush system, a variable-frequency translating device, connecting means whereby said converter may be operated, at times, as a frequency converter to transfer variable-frequency energy to said translating device through said rotatable brush system, and connecting means whereby said primary windings may be energized single phase and whereby said secondary windings may be utilized as a source of double-frequency energy.

21. A system including a frequency converter having primary windings, slip-rings for said primary windings, a commutator cylinder for said primary windings, a rotatable brush system co-operating with said commutator cylinder, means for varying the speed of said brush system, a variable-frequency translating device, and means for, at times, connecting said translating device to said brushes, and, at other times, connecting said translating device to said slip rings.

22. A system including a frequency converter having primary windings, secondary windings, slip-rings for said primary windings, a commutator cylinder for said primary windings, a rotatable brush system co-operating with said commutator cylinder, means for varying the speed of said brush system, a variable-frequency translating device, connecting means whereby said converter may be operated, at times, as a frequency converter to transfer variable-frequency energy to said translating device through said rotatable brush system, connecting means whereby said converter may be operated as a phase converter receiving and supplying energy through its slip-rings, and connecting means whereby said primary windings may be energized single phase and whereby said secondary windings may be utilized as a source of double-frequency energy.

23. The combination with a source of single-phase alternating current, of a phase converter of the dynamo-electric machine type embodying primary, secondary and tertiary windings, and having its primary winding connected to said source, a polyphase load circuit, means for, at times, energizing said load circuit from said source and said tertiary windings, whereby it is energized with polyphase currents of the frequency of said source, and means for, at other times, energizing said load circuit from the polyphase electromotive forces of double the frequency of said source and of backward phase sequence existing in the secondary winding of said converter.

24. A system of transformation comprising a single-phase dynamo-electric machine having an armature, a pair of slip rings, a commutator, a good damper winding and a plurality of symmetrically placed, revoluble brushes, means for revolving said brushes at a predetermined speed or speeds, and an induction machine connected in series relation to said brushes and adapted to rotate substantially in synchronism with the currents produced by the residue of the negative-phase-sequence armature field which is not altogether damped out by said damper winding.

25. The combination with a commutator electric machine, of means tending to cause undesirable alternating currents of relatively high frequency to flow in the circuit including said commutator, and an induction machine connected in series relation to said circuit and adapted to rotate substantially in synchronism with said currents.

In testimony whereof, I have hereunto subscribed my name this 18th day of April, 1922.

CHARLES LE G. FORTESCUE.